(12) United States Patent
Nilsen

(10) Patent No.: US 11,077,940 B2
(45) Date of Patent: Aug. 3, 2021

(54) AIRCRAFT AND METHOD OF USE

(71) Applicant: Stian Nilsen, New York, NY (US)

(72) Inventor: Stian Nilsen, New York, NY (US)

(*) Notice: Subject to any disclaimer, the term of this patent is extended or adjusted under 35 U.S.C. 154(b) by 287 days.

(21) Appl. No.: 16/122,366

(22) Filed: Sep. 5, 2018

(65) Prior Publication Data

US 2020/0070970 A1 Mar. 5, 2020

(51) Int. Cl.
*B64C 29/00* (2006.01)
*B64C 1/14* (2006.01)
*B64D 31/06* (2006.01)
*B64C 25/06* (2006.01)

(52) U.S. Cl.
CPC ........ *B64C 29/0075* (2013.01); *B64C 1/1476* (2013.01); *B64C 25/06* (2013.01); *B64D 31/06* (2013.01)

(58) Field of Classification Search
CPC ... B64C 1/1476; B64C 25/06; B64C 29/0075; B64D 27/18; B64D 31/06
USPC ...................................................... 244/12.4
See application file for complete search history.

(56) References Cited

U.S. PATENT DOCUMENTS

| | | | | |
|---|---|---|---|---|
| 2,621,001 A * | 12/1952 | Roman | ............... | B64C 29/0033 244/7 C |
| 2,708,081 A * | 5/1955 | Dobson | ............... | B64C 29/0033 244/7 C |
| 2,970,793 A * | 2/1961 | Beem | ....................... | B64C 1/32 244/121 |
| 3,039,719 A * | 6/1962 | Platt | .................... | B64C 29/0033 244/7 C |
| 3,259,343 A * | 7/1966 | Roppel | ............... | B64C 29/0091 244/53 R |
| 3,326,498 A * | 6/1967 | Corning | ................. | B64C 29/02 244/12.4 |
| 3,666,209 A * | 5/1972 | Taylor | ................. | B64C 29/0033 244/7 C |
| 4,537,372 A * | 8/1985 | Forizs | ................. | B64C 29/0033 244/12.4 |
| 8,366,049 B2 * | 2/2013 | Karem | ............... | B64C 29/0033 244/137.1 |
| 9,499,266 B1 * | 11/2016 | Garreau | ................ | B64C 39/068 |
| 9,975,631 B1 * | 5/2018 | McLaren | ........... | B64C 29/0033 |
| 10,399,673 B1 * | 9/2019 | Roop | ........................ | B64C 3/30 |
| 10,513,332 B2 * | 12/2019 | Alber | ...................... | B64C 11/28 |
| 10,513,334 B2 * | 12/2019 | Groninga | ............... | B64D 27/24 |
| 10,562,620 B2 * | 2/2020 | Kroo | ................... | B64C 29/0033 |
| 10,589,854 B2 * | 3/2020 | Alber | ..................... | B64D 27/12 |

(Continued)

*Primary Examiner* — Claude J Brown
(74) *Attorney, Agent, or Firm* — Leavitt Eldredge Law Firm

(57) ABSTRACT

An aircraft includes a fuselage having an interior cockpit to hold one or more seats; a canopy pivotally attached to the fuselage to provide access to the interior cockpit; wings extending away from the fuselage, each having a motor positioned at a first end; a tilting bar extending through the fuselage and engaging with a pivot point associated with each of the wings, the tilting bar allowing for the fuselage to rotate about the pivot bar and thereby stay in an upright position, regardless of the positioning of each of the wings; one or more landing legs positioned aside the fuselage and to support the fuselage during landing; a computing device to control each motor, each motor can be controlled independently; the cockpit is sized to hold one or more people; and the motor of each of the wings provides lifting force.

7 Claims, 6 Drawing Sheets

(56) References Cited

U.S. PATENT DOCUMENTS

| | | | |
|---|---|---|---|
| 10,661,892 B2* | 5/2020 | McCullough | B64C 29/0033 |
| 10,696,390 B2* | 6/2020 | Winston | B64C 3/385 |
| 2010/0124865 A1* | 5/2010 | Van De Rostyne | A63H 27/12 |
| | | | 446/37 |
| 2011/0042509 A1* | 2/2011 | Bevirt | B64C 29/0033 |
| | | | 244/12.4 |
| 2013/0099065 A1* | 4/2013 | Stuhlberger | B64C 27/22 |
| | | | 244/7 C |
| 2014/0124613 A1* | 5/2014 | Yang | B64C 37/00 |
| | | | 244/12.4 |
| 2016/0031555 A1* | 2/2016 | Bevirt | B64C 39/068 |
| | | | 244/7 C |
| 2016/0196755 A1* | 7/2016 | Navot | G05D 1/0676 |
| | | | 701/4 |
| 2018/0290742 A1* | 10/2018 | Oldroyd | B64C 29/02 |
| 2020/0031464 A1* | 1/2020 | Shafir | B64C 25/32 |
| 2020/0062383 A1* | 2/2020 | Kim | B64C 3/385 |

* cited by examiner

AIRCRAFT AND METHOD OF USE

BACKGROUND

1. Field of the Invention

The present invention relates generally to aircraft systems, and more specifically, to an aircraft with four motor units that control the position and movement of the aircraft, the fuselage of the aircraft being engaged with a tilt bar to allow the cockpit of the aircraft to pivot and maintain an upright position, as the wings are used during flight, landing, and takeoff.

2. Description of Related Art

Aircraft systems are well known in the art and are effective means of entertainment, and transportation. Conventional aircraft systems that are suitable for transporting one or more passengers typically include a fuselage with wings extending horizontally therefrom. One of the problems commonly associated with conventional aircraft systems is the inefficiency of use, especially for the transportation of just one or two passengers. For example, large amounts of energy are needed to place conventional aircrafts in the air and transport them from one location to another. Accordingly, it is desirable to have an aircraft system capable of transporting a limited number of passengers, while being efficient.

In addition, vertical take-off and landing (VTOL) aircrafts are known in the art and are configured to hover, take off, and land vertically. These aircrafts also require a large amount of energy, and accordingly it is desirable to provide an efficient VTOL aircraft for transportation of a limited number of passengers.

Accordingly, although great strides have been made in the area of aircraft systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
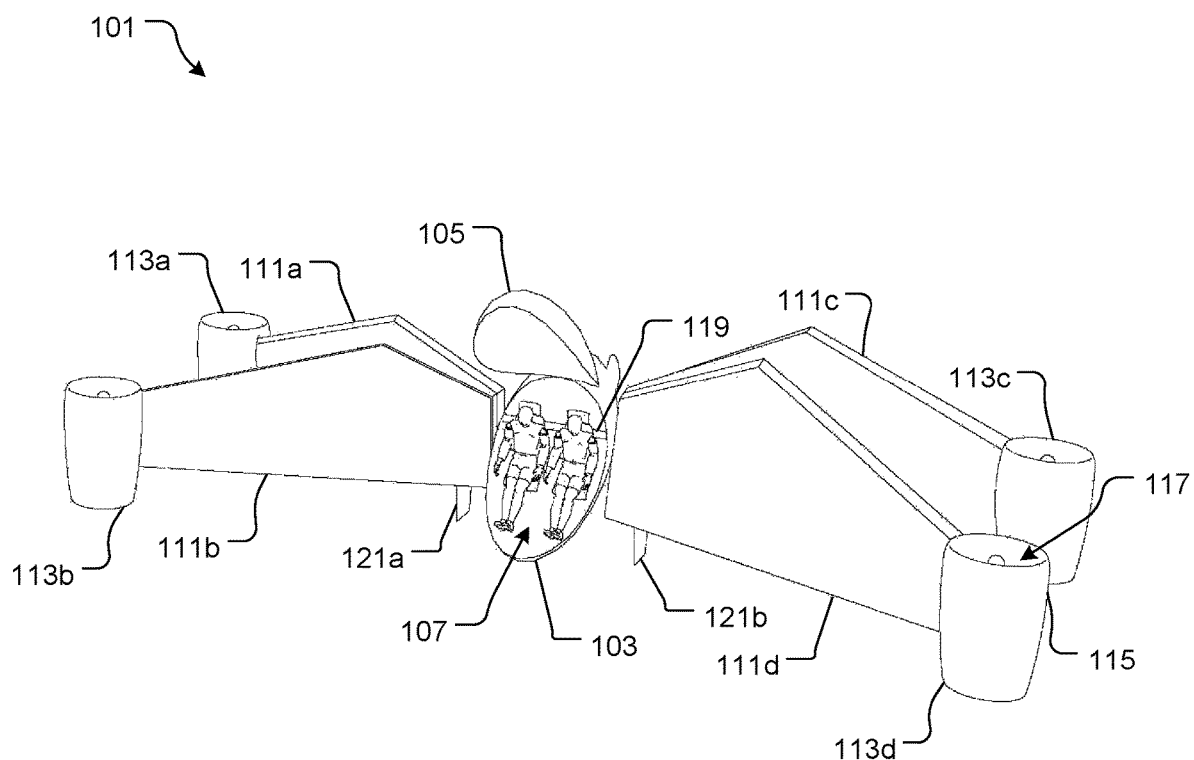
FIG. 1 is an oblique view of an aircraft system in accordance with a preferred embodiment of the present application with the plurality of wings at an orientation appropriate for takeoff and landing.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional aircraft systems. Specifically, the present invention provides for an efficient aircraft system configured to transport a limited number of passengers. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
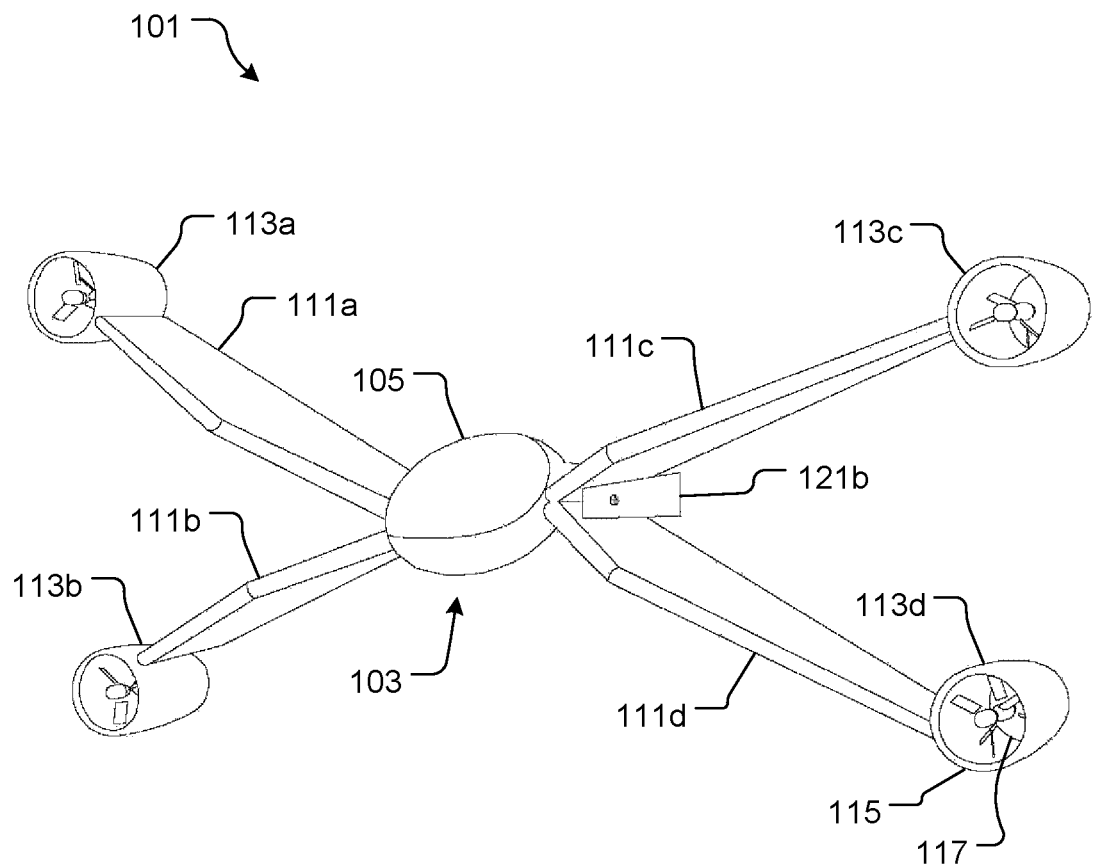
FIG. 2 is an oblique view of the aircraft system of FIG. 1 with the plurality of wings at an orientation appropriate for flight.

Referring now to the drawings wherein like reference characters identify corresponding or similar elements throughout the several views, FIGS. 1 and 2 depict oblique views of an aircraft system 101 in accordance with a preferred embodiment of the present application. It will be appreciated that system 101 overcomes one or more of the above-listed problems commonly associated with conventional aircraft systems.

In the contemplated embodiment, system 101 includes a fuselage 103 having a canopy 105 pivotally attached thereto and configured to provide access to a cockpit 107. It should be appreciated that the fuselage 103 can vary in size and materials. In the preferred embodiment, two seats are secured within the cockpit to allow for transportation of two passengers.

As shown, the preferred embodiment includes four wings 111a-d extending away from fuselage 103. In the preferred embodiment, these wings are positioned slightly rearward, thereby providing the passenger with improved visibility, not being obstructed by the wings.

Each wing 111a-d includes a motor 113a-d, wherein each motor includes a housing 115 and a propeller 117 secured therein. It should be appreciated that the housing provides for safety and protection of the propeller 117, and further provides for increased thrust when needed. The wings 111a-d are engaged with the fuselage 103 via a tilting bar 119 that allows for the fuselage 103 to rotate relative to the wings (shown from FIG. 1 to FIG. 2). The tiling bar allows for gravity to aid in ensuring that the fuselage remains in an upright position, as the wings are rotated based on thrust.

During use, the motor of each wing is configured to provide thrust to allow for the aircraft to take off from the ground surface. Once the aircraft is engaged in flight, each motor can be independently controlled via a computer 303, to allow for the aircraft to fly as desired by the user.

In the preferred embodiment, aircraft system 101 further includes one or more landing legs 121 engaged between each pair of legs, that allow for the aircraft to come to a rest on the ground surface, the landing legs providing support to the fuselage.

Figure 3:
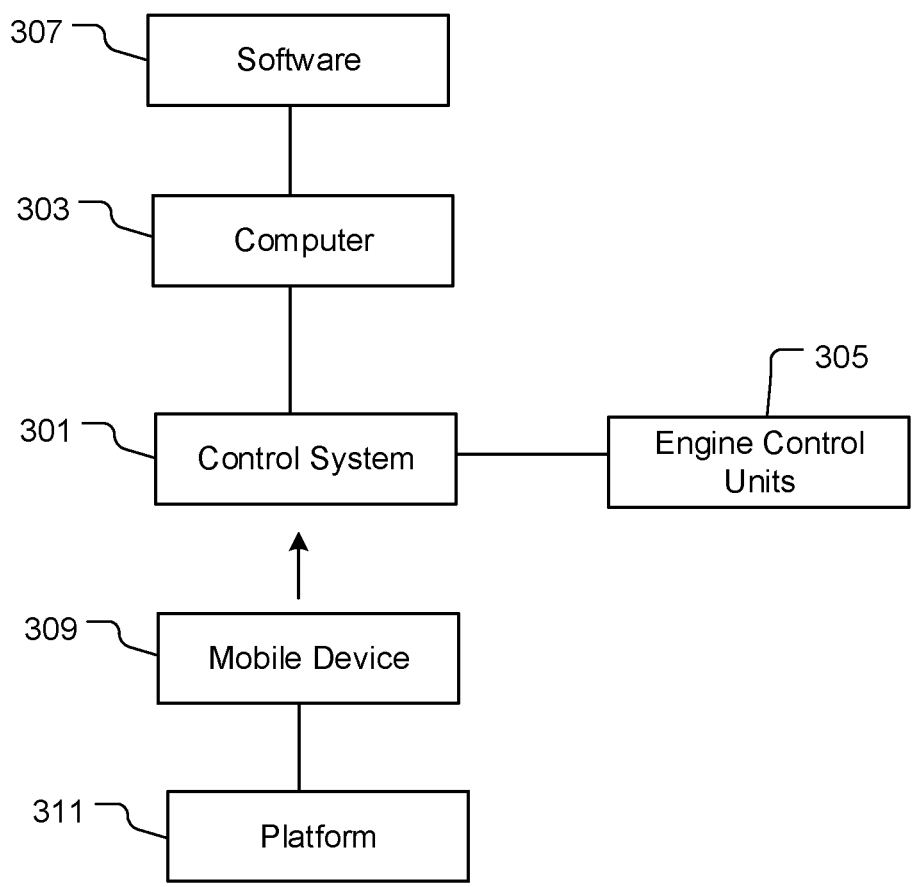
FIG. 3 is a simplified schematic of a control system of the aircraft system of FIG. 1.

In FIG. 3, a simplified schematic depicts the control system 301 of aircraft system 101. Control system 301 includes a computer 303 configured to communicate with control units 305 associated with each motor. It should be appreciated that all yaw, pitch, and roll is done by means of varying the speed of each motor. The computer 303, along with software 307, can be configured to safely land, even if one motor goes out, by slowing the motor across from the out motor, and making it take on a pitch of the aircraft only. In such an emergency, the motor does not provide thrust anymore, just tilt stabilization.

The control system 301 can further be configured to detect altitude, speed, direction, fuselage orientation, and the like.

It should be appreciated that in some embodiments, a mobile computing device (such as a phone, tablet, or computer) 309, along with a platform 311, such as a mobile application can be used for controlling the aircraft, wherein the platform 311 provides a means to control navigation, as well as other functions.

Figure 4:
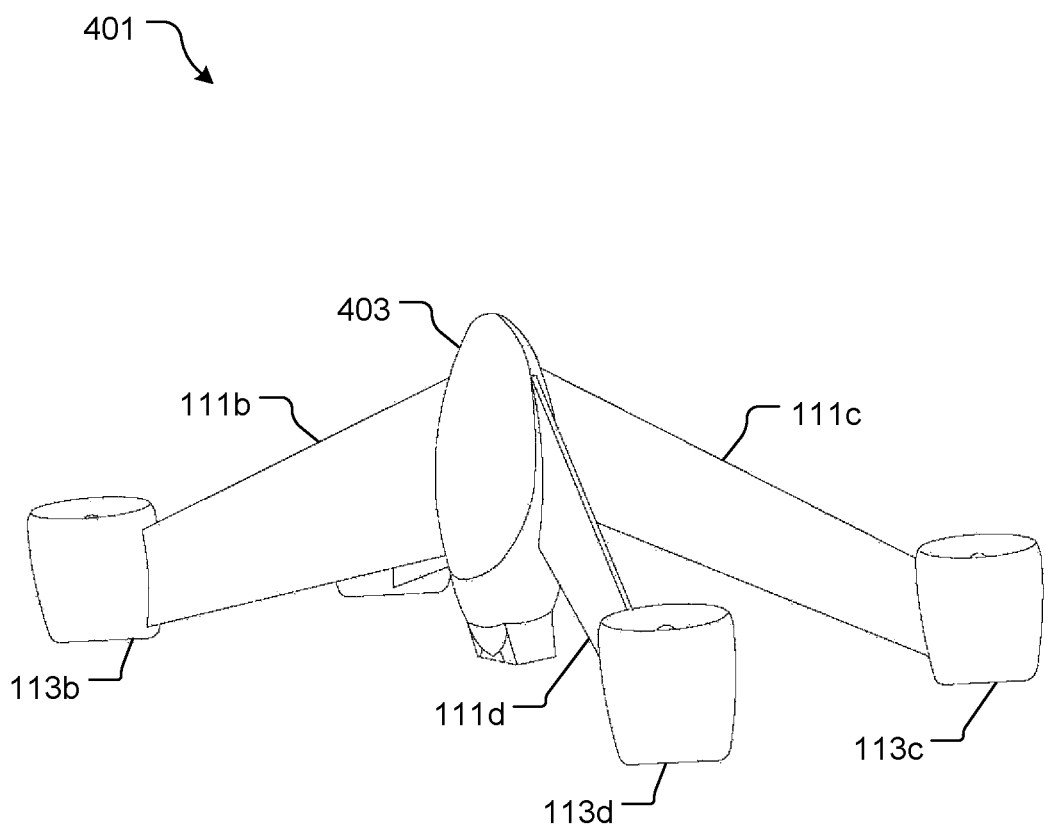
FIG. 4 is an oblique view of an alternative embodiment of an aircraft system in accordance with a preferred embodiment of the present application.

In FIG. 4, an oblique view depicts an alternative embodiment of an aircraft system 401, wherein a fuselage 403 includes an interior cockpit configured to hold a single passenger. It should be appreciated that the remaining components of system 401 are substantially similar to the components of system 101.

Figure 5:
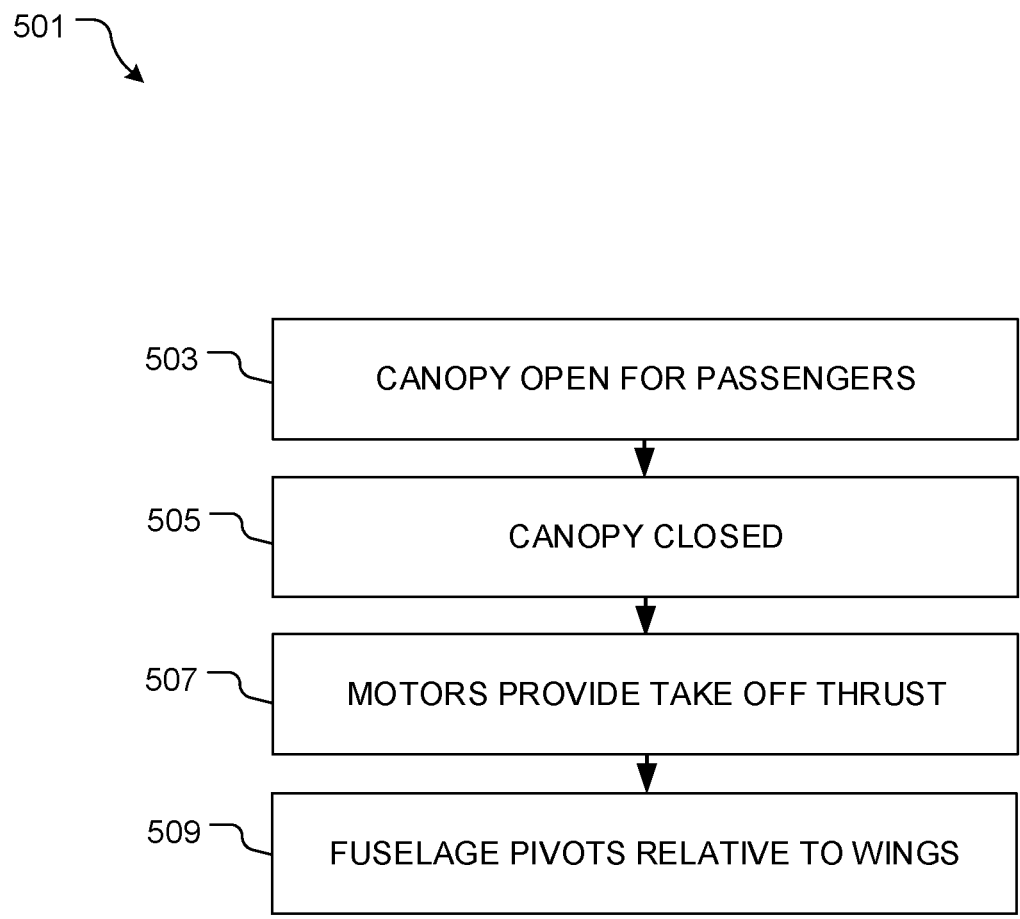
FIG. 5 is a flowchart of the method of use of the aircraft systems of FIG. 1 and FIG. 4.

In FIG. 5, a flowchart 501 depicts a method of use of system 101. During use, the canopy is opened to allow one or more passengers to enter the cockpit, as shown with box 503. The canopy is closed and the motor of each wing provides thrust to allow for the aircraft to take off, as shown with boxes 505, 507. The fuselage pivots relative to the wings during flight, wherein gravity aids in keeping the fuselage in an upright position, as shown with box 509.

Figure 6:
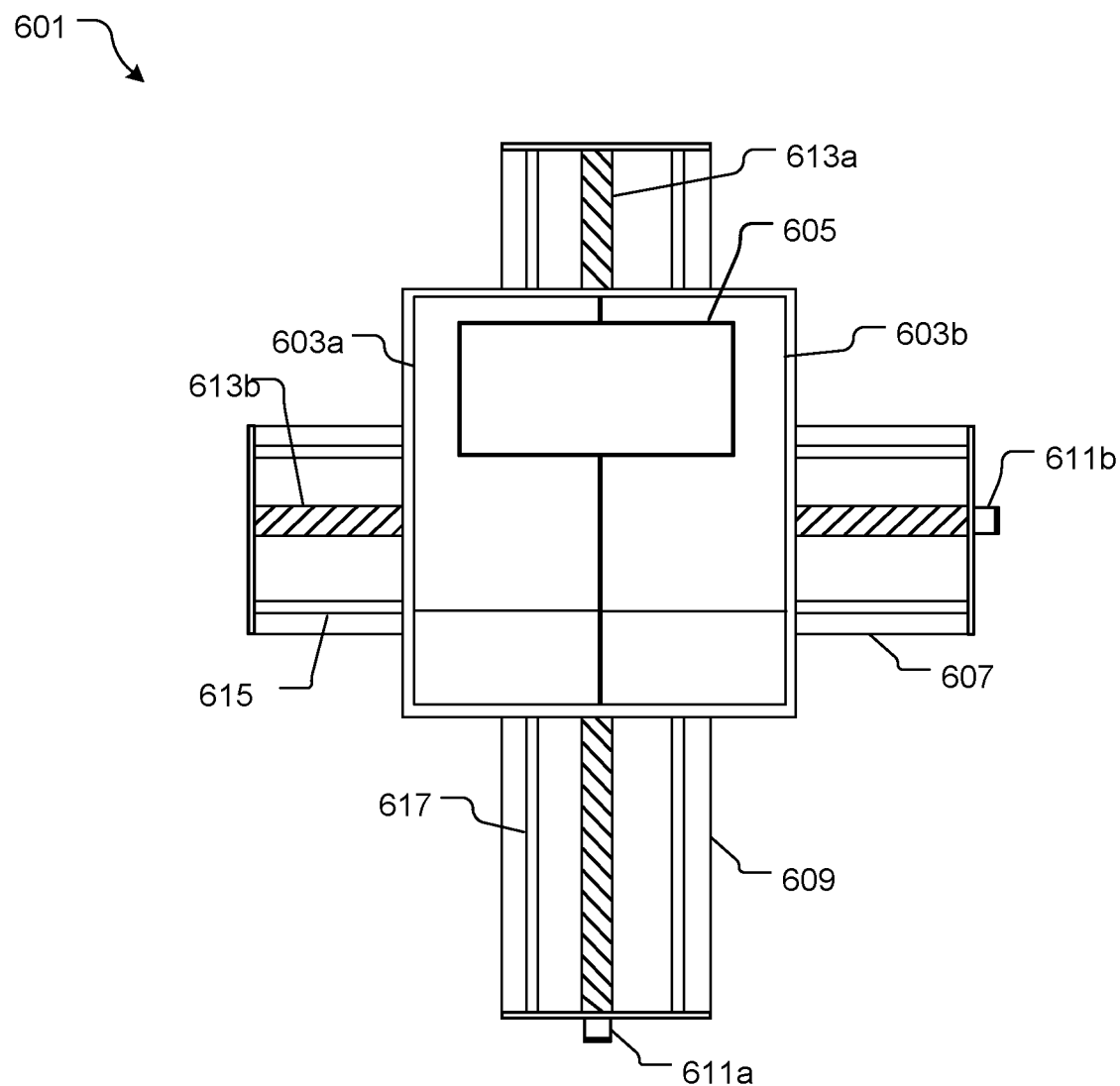
FIG. 6 is a simplified top view of a counterbalance platform as contemplated for use with the present invention.

In some embodiments, the aircraft systems described herein further include a counterweight platform 601, as shown in FIG. 6, the counterweight platform 601 being configured to be secured at a position within an interior of the cockpit. The platform 601 is configured to house one or more batteries 603a-b and a controller 605. The one or more batteries 603a-b are secured on top of supports 607, 609, the supports having brushless motors 611a-b and worm drives 613a-b, to allow for movement in two directions. The movement allows for the platform to provide counterweight to the load of the cockpit. In some embodiments, the supports 607, 609 include rails 615, 617 to facilitate movement, however, it should be appreciated that alternative configurations could be used.

It should further be appreciated that in some embodiments, a platform can be positioned behind the fuselage, wherein the platform can hold one or more batteries, carry cargo, and the like.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:
1. An aircraft comprising:
   a fuselage having an interior cockpit configured to hold one or more seats, the fuselage is configured to remain in an upright position relative to the ground surface during flight;
   a counterweight platform secured within the interior cockpit, the counterweight platform having:
      a first support and a second support, the first support extending perpendicular to the second support;
      a plurality of batteries secured to the first support;
      one or more motors associated with one or more worm drives, the one or more motors and the one or more worm drives are configured to move the plurality of batteries along the first support and the second support;
   a canopy pivotally attached to the fuselage and configured to provide access to the interior cockpit;
   a plurality of wings extending away from the fuselage, each of the plurality of wings having:
      a motor positioned at a first end;
   the plurality of wings being four wings, the four wings extending away from the fuselage in an X configuration;
   a tilting bar extending through the fuselage and engaging with a pivot point associated with each of the plurality of wings, the tilting bar allowing for the fuselage to rotate about the pivot joint and thereby stay in an upright position, regardless of the positioning of each of the plurality of wings;
   one or more landing legs positioned aside the fuselage and configured to support the fuselage during landing, the one or more landing legs are secured to the plurality of wings; and
   a computing device configured to control each motor, wherein each motor can be controlled independently;
   wherein the cockpit is sized to hold one or more people;
   wherein the motor of each of the plurality of wings provides lifting force;
   wherein the fuselage remains in the upright position as the plurality of wings rotate relative to the fuselage; and wherein the plurality of wings do not obstruct access to the interior cockpit when the plurality of wings rotate relative to the fuselage.

2. The aircraft of claim 1, wherein the tilting bar is positioned above a balanced nodal associated with the fuselage, thereby allowing gravity to keep the fuselage in the upright position.

3. The aircraft of claim 1, further comprising:
one or more seats positioned within the cockpit.

4. The aircraft of claim 1, wherein the plurality of wings are positioned at a rear point of the fuselage, thereby increasing visibility from the cockpit.

5. The aircraft of claim 1, wherein each motor of the plurality of wings comprises: at least one propeller surrounded by a housing and configured to provide thrust.

6. The aircraft of claim 1, wherein the computer further comprises:
a lower power setting;
wherein the computer is configured to determine an elevation and a weight associated with the cockpit; and
wherein activation of the lower power setting allows the aircraft to move about an area at a predetermined distance from a ground surface.

7. The aircraft of claim 6, wherein the predetermined distance is approximately 6 inches.

* * * * *